(12) United States Patent
Zhang et al.

(10) Patent No.: US 7,498,909 B2
(45) Date of Patent: Mar. 3, 2009

(54) GROUND-FAULT CIRCUIT INTERRUPTER WITH REVERSE WIRING PROTECTION

(75) Inventors: Long Zhang, Shanghai (CN); Cheng Li Li, Shanghai (CN)

(73) Assignee: Shanghai ELE Manufacturing Corp., Shanghai (CN)

( * ) Notice: Subject to any disclaimer, the term of this patent is extended or adjusted under 35 U.S.C. 154(b) by 90 days.

(21) Appl. No.: 11/484,506

(22) Filed: Jul. 10, 2006

(65) Prior Publication Data

US 2007/0279162 A1 Dec. 6, 2007

(30) Foreign Application Priority Data

Jan. 11, 2006 (CN) .................. 2006 2 0000667 U
May 30, 2006 (CN) .................. 2006 2 0117867 U (51) Int. Cl.
*H01H 73/00* (2006.01)
*H01H 73/12* (2006.01)
*H01H 75/00* (2006.01)
*H01H 83/06* (2006.01)

(52) U.S. Cl. .................. 335/18; 335/6; 335/13; 335/21; 335/34; 335/52; 335/71; 335/88; 335/116; 335/150; 361/42

(58) Field of Classification Search ............ 335/6, 335/13, 21–27, 34, 52, 71, 72, 77, 88, 116, 335/150, 166, 172, 199, 202
See application file for complete search history.

(56) References Cited

U.S. PATENT DOCUMENTS

| | | | |
|---|---|---|---|
| 3,766,434 A | 10/1973 | Sherman | |
| 4,051,544 A | 9/1977 | Vibert | |
| 4,159,499 A | 6/1979 | Bereskin | |
| 4,618,907 A | 10/1986 | Leopold | |
| 5,594,398 A * | 1/1997 | Marcou et al. | 335/18 |
| 5,831,395 A | 11/1998 | Mortimer et al. | |
| 6,040,967 A | 3/2000 | DiSalvo | |
| 6,246,558 B1 | 6/2001 | DiSalvo et al. | |
| 6,282,070 B1 | 8/2001 | Ziegler et al. | |
| 6,381,112 B1 | 4/2002 | DiSalvo | |
| 6,437,953 B2 * | 8/2002 | DiSalvo et al. | 361/42 |
| 6,646,838 B2 | 11/2003 | Ziegler et al. | |
| 6,657,834 B2 | 12/2003 | DiSalvo | |
| 6,671,145 B2 * | 12/2003 | Germain et al. | 361/45 |
| 6,693,779 B2 | 2/2004 | DiSalvo | |
| 6,717,782 B2 | 4/2004 | DiSalvo et al. | |
| 6,734,769 B1 | 5/2004 | Germain et al. | |

(Continued)

*Primary Examiner*—Elvin G Enad
*Assistant Examiner*—Mohamad A Musleh
(74) *Attorney, Agent, or Firm*—Chen Yoshimura LLP (57) ABSTRACT

An improved ground-fault circuit interrupter (GFCI) receptacle with reverse wiring protection. If the power lines are incorrectly connected to the load end of the receptacle during installation, power output to both the input end of the receptacle and the insertion outlets on the faceplate is prevented. The GFCI receptacle includes two stationary terminals on two first output conductors electrically connected to the insertion outlet, two stationary terminals on two second output conductors adapted for electrically connecting to the load, and four moveable terminal on two moveable connector arm adapted for electrically connecting to the power lines. The four moveable terminals corresponds in position to the four stationary terminals, respectively, and operate to electrical connect or disconnect the power lines to and from the load and the insertion outlet in a manner controlled by a disconnecting mechanism assembly and a reverse wiring protection mechanism.

9 Claims, 9 Drawing Sheets

U.S. PATENT DOCUMENTS

| | | | |
|---|---|---|---|
| 6,771,152 B2 | 8/2004 | Germain et al. | |
| 6,813,126 B2 | 11/2004 | DiSalvo et al. | |
| 6,828,886 B2 | 12/2004 | Germain et al. | |
| 6,864,766 B2 | 3/2005 | DiSalvo et al. | |
| 6,864,769 B2 | 3/2005 | Germain et al. | |
| 6,873,231 B2 | 3/2005 | Germain et al. | |
| 6,900,972 B1 | 5/2005 | Chan et al. | |
| 6,937,451 B2 | 8/2005 | Ulrich et al. | |
| 6,944,001 B2 | 9/2005 | Ziegler et al. | |
| 6,954,125 B2 * | 10/2005 | Wu et al. | 335/18 |
| 6,975,192 B2 | 12/2005 | Disalvo | |
| 6,975,492 B2 | 12/2005 | DiSalvo | |
| 6,982,856 B2 | 1/2006 | Bernstein | |
| 7,009,473 B2 * | 3/2006 | Zhang | 335/6 |
| 7,031,125 B2 | 4/2006 | Germain et al. | |
| 7,042,688 B2 | 5/2006 | Chan et al. | |
| 7,049,910 B2 | 5/2006 | Campolo et al. | |
| 7,088,205 B2 | 8/2006 | Germain et al. | |
| 7,098,761 B2 * | 8/2006 | Germain et al. | 335/18 |
| 7,154,718 B1 * | 12/2006 | Finlay et al. | 361/42 |
| 7,164,564 B1 | 1/2007 | Finlay, Sr. et al. | |
| 7,173,799 B1 * | 2/2007 | Weeks et al. | 361/42 |
| 7,195,500 B2 * | 3/2007 | Huang et al. | 439/107 |
| 7,212,386 B1 * | 5/2007 | Finlay et al. | 361/42 |
| 7,227,435 B2 * | 6/2007 | Germain et al. | 335/18 |
| 7,256,973 B1 | 8/2007 | Radosavljevic et al. | |
| 7,271,987 B1 * | 9/2007 | Zhang et al. | 361/42 |
| 7,289,306 B2 * | 10/2007 | Huang et al. | 361/42 |
| 7,295,415 B2 * | 11/2007 | Huang et al. | 361/107 |
| 2004/0021996 A1 * | 2/2004 | Wu et al. | 361/42 |
| 2004/0027740 A1 * | 2/2004 | Huang et al. | 361/42 |
| 2004/0070897 A1 * | 4/2004 | Wu et al. | 361/42 |
| 2005/0264383 A1 * | 12/2005 | Zhang | 335/18 |

* cited by examiner

GROUND-FAULT CIRCUIT INTERRUPTER
WITH REVERSE WIRING PROTECTION

This application claims foreign priority benefits under 35 U.S.C. §119(a)-(d) from China Patent Application No. 200620000667.2, filed Jan 11, 2006, and China Patent Application No. 200620117867.6, filed May 30, 2006.

BACKGROUND OF THE INVENTION

1. Field of the Invention

The present invention relates to leakage current protection devices, and more particularly relates to improved ground-fault circuit interrupters with a reverse wiring protection function.

2. Description of the Related Art

A receptacle type ground-fault circuit interrupter (GFCI) device with reverse wiring protection is described in commonly owned U.S. Pat. No. 7,009,473, issued Mar. 7, 2006. This device provides both leakage current protection and reverse wiring protection that protects against incorrect wiring during installation. Such a GFCI receptacle has a pair of input terminals for connecting to power lines, a pair of output terminals for connecting to a load, and one or more insertion outlets on a faceplate of the receptacle each for receiving the prongs of a plug. When installing the GFCI receptacle in the wall, if the power lines from the wall are incorrectly connected to the output (load) end of the receptacle, the GFCI device effectively cuts off power output at the input end of the receptacle. However, when such reverse wiring occurs, the insertion outlets on the faceplate still has power. Moreover, the insertion outlets are not protected against leakage current by the circuit interrupter. This compromises the safety of the device.

SUMMARY OF THE INVENTION

The present invention is directed to a GFCI device that is an improvement of the GFCI device described in commonly owned U.S. Pat. No. 7,009,473.

An object of the present invention is to provide a safer GFCI receptacle device.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides an improved ground-fault circuit interrupter device having a reverse wiring protection function and being adapted for connecting to hot and neutral power lines and hot and neutral load lines, which includes: a cover; an insulating member; a base; a mounting and insulating plate disposed between the cover and the insulating member; an electrical component mounting member disposed within the base and located between the insulating member and the base; and first hot and neutral output conductors disposed on two sides of the insulating member, the first hot output conductor having a first insertion plate and a first resilient stationary terminal carrier carrying a first stationary terminal, the first neutral output conductor having a second insertion plate and a second resilient stationary terminal carrier carrying a second stationary terminal; wherein the electrical component mounting member includes a differential transformer for detecting a leakage current, first and second moveable connector arms passing through the differential transformer and being adapted to be connected to the hot and neutral power lines, respectively, second hot and neutral output conductors, a disconnecting mechanism assembly for electrically connecting and disconnecting the first hot and neutral output conductors to and from the first and second moveable connector arms, and a reverse wiring protection mechanism, wherein the first moveable connector arm carries a first and a second moveable terminal and the second moveable connector arm carries a third and a fourth moveable terminal, wherein the second hot and neutral output conductors carry a third and a fourth stationary terminal, respectively, and are adapted to be electrically connected to the hot and neutral load lines, respectively, and wherein the first and third moveable terminals corresponds in position to the first and second stationary terminals, respectively, and the second and fourth moveable terminals corresponds in position to the third and fourth stationary terminals, respectively.

The improved ground-fault circuit interrupter device further includes a reset button; and a switch coupled to the reset button, wherein the switch is closed when the reset button is pressed down and open when the reset button returns to its un-pressed condition, wherein the disconnecting mechanism assembly includes a solenoid, and wherein the switch is connected in series with a current path of the solenoid.

It is to be understood that both the foregoing general description and the following detailed description are exemplary and explanatory and are intended to provide further explanation of the invention as claimed.

DETAILED DESCRIPTION OF THE PREFERRED EMBODIMENTS

The present invention is an improvement of the GFCI device described in commonly owned U.S. Pat. No. 7,009,473, which is herein incorporated by reference in its entirety.

Embodiments of the present invention are described with reference to the drawings. Although specific embodiments of the present invention will be described, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
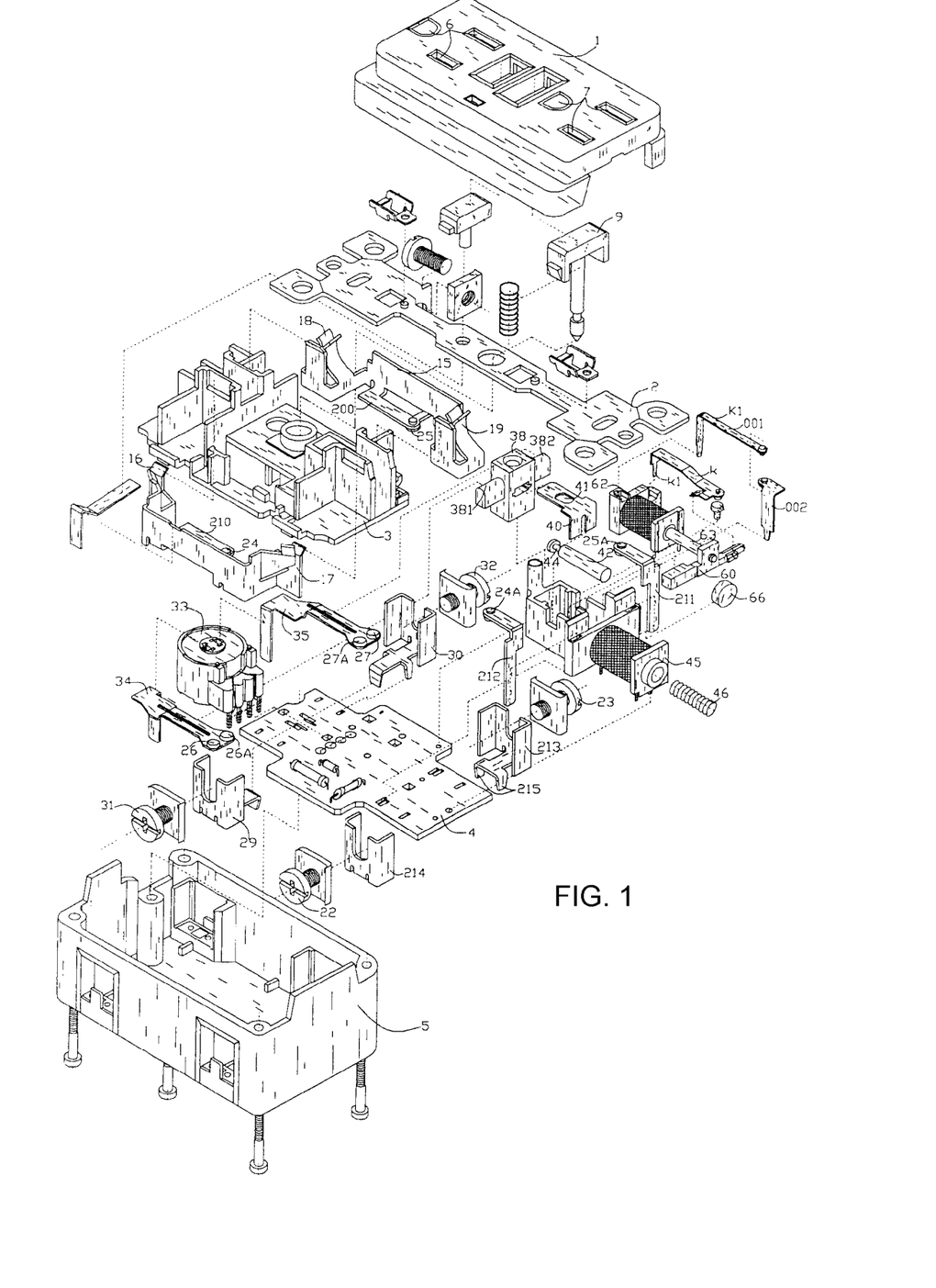
FIG. 1 is an exploded view showing the structure of a GFCI receptacle device according to an embodiment of the present invention.
Figure 2:
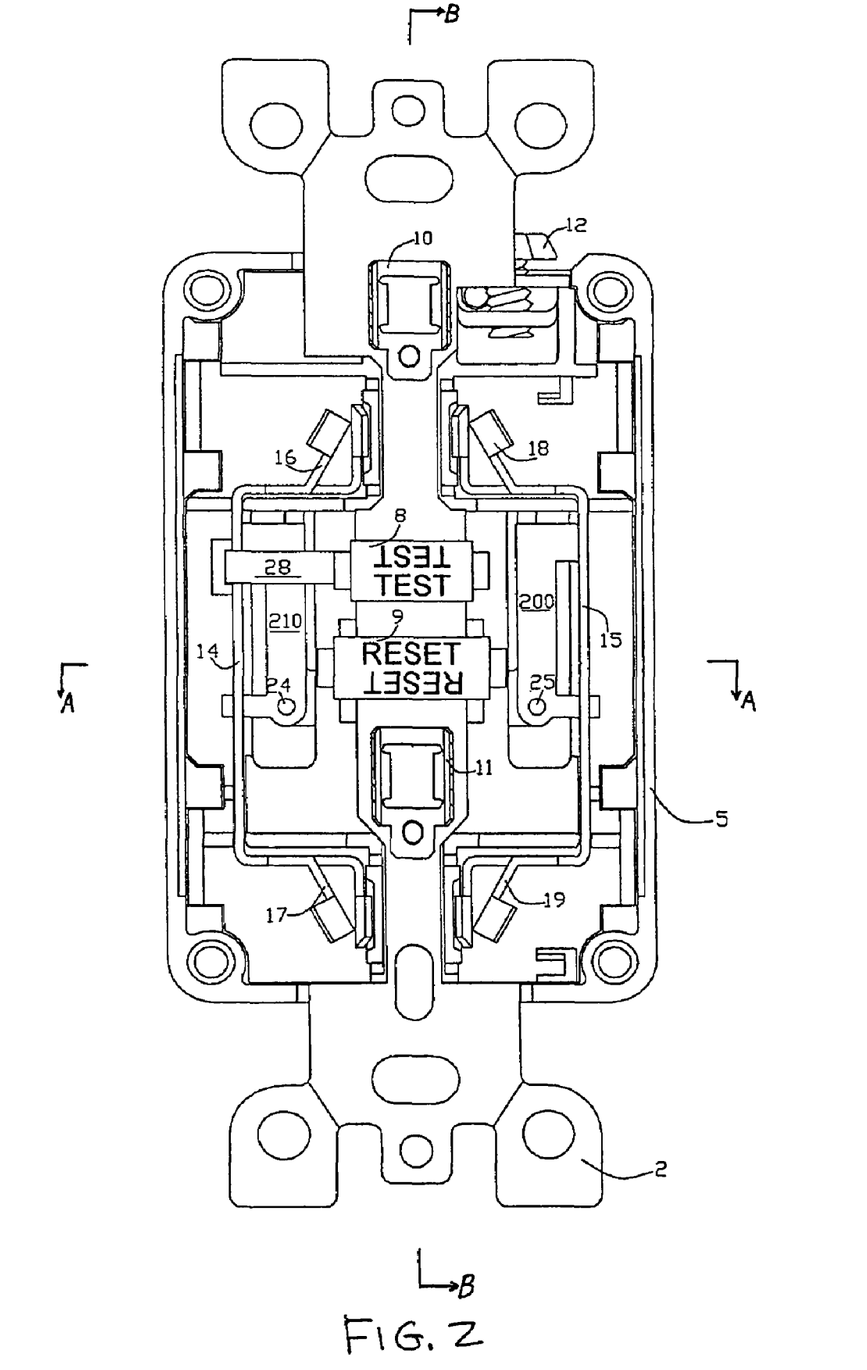
FIG. 2 is a top plan view of the GFCI receptacle with the cover removed.
Figure 3:
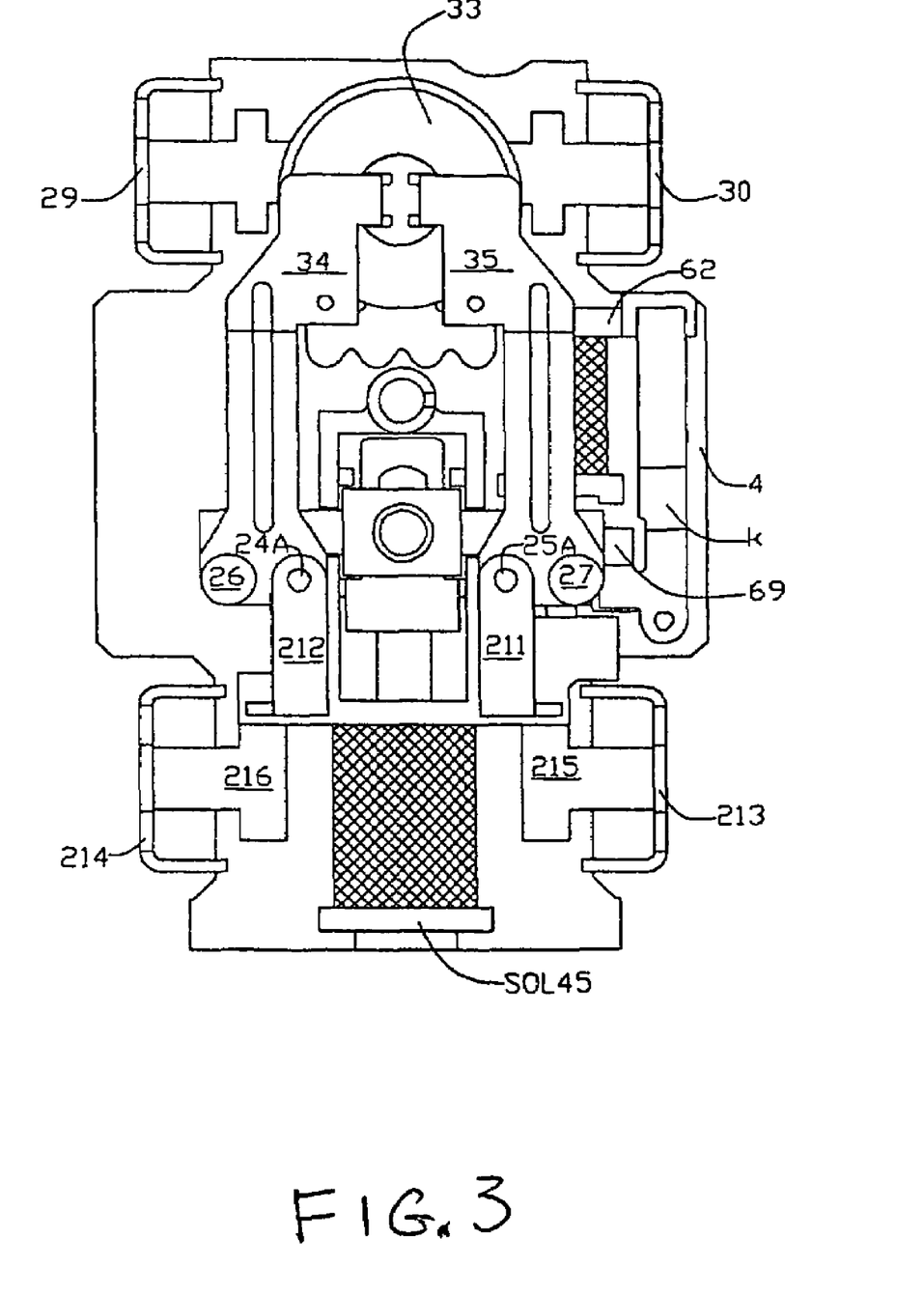
FIG. 3 illustrates the electrical component mounting member of the GFCI receptacle with the components mounted thereon.

As shown in FIGS. 1-3, an improved GFCI receptacle with a reverse wiring protection function according to an embodiment of the present invention includes a cover (faceplate) 1, a base 5, a mounting and grounding plate 2, an insulating member 3, and an electrical component mounting member 4. The mounting and grounding plate 2 is disposed between the cover 1 and the insulating member 3. The insulating member 3 is disposed between the mounting and grounding plate 2 and the electrical component mounting member 4. The electrical component mounting member 4 is disposed between the insulating member 3 and the base 5 and within the base 5.

Disposed on two sides of the insulating member 3 are a first hot (power) output conductor 14 and a first neutral (white) output conductor 15. The first hot output conductor 14 has insertion plates 16, 17 on its two ends and a stationary terminal 24 between them. The first neutral output conductor 15 has insertion plates 18, 19 on its two ends and a stationary terminal 25 between them. The insertion plates 16, 18, 17, 19 are for receiving to hot and neutral prongs of two plugs inserted into the insertion outlets 6, 7 of the GFCI receptacle. Alternatively, only one pair of insertion plates 16, 18 may be provided to form a receptacle having only one insertion outlet for receiving one plug.

The following components are provided on the electrical component mounting member 4: a hot input conductor 29 adapted for connecting to the hot power line by a connecting screw 31; a neutral input conductor 30 adapted for connecting to the neutral power line by a connecting screw 32; a differential transformer 33 for detecting a leakage current, a pair of moveable connector arms 34, 35 that pass through the differential transformer 33 and are electrically connected to the hot and neutral input conductors 29, 30; a disconnecting mechanism assembly that includes a disconnecting mechanism 38, a L-shaped lock member 40, a plunger 42, a solenoid 45 and a spring 46 for electrically connecting and disconnecting the first hot and neutral output conductors 14, 15 to and from the moveable connector arms 34, 35; and a reverse wiring protection mechanism that includes a coil 62, a core 63, a moveable piece 60, a permanent magnet 66 and a switch plate K for preventing power output when the input and output ends of the GFCI are incorrectly wired. The structure and operation of the disconnecting mechanism assembly and the reverse wiring protection mechanism are described more fully in the commonly owned U.S. Pat. No. 7,009,473.

To improve the reverse wiring protection function, as shown in FIGS. 1-3, a pair of resilient stationary terminal carriers 210, 200 are provided on the inside of the middle portion of the first hot and neutral output conductors 14, 15. One end of the resilient stationary terminal carriers 210, 200 are respectively connected at to the first hot and neutral output conductors 14, 15, and another end of the resilient stationary terminal carriers 210, 200 carry stationary terminals 24, 25, respectively. During manufacturing, the first hot output conductor 14, the insertion plates 16, 17, the stationary terminal 24 and the resilient stationary terminal carrier 210 may be formed as one piece by pressing. Similarly, the first neutral output conductor 15, the insertion plates 18, 19, the stationary terminal 25 and the resilient stationary terminal carrier 200 may be formed as one piece by pressing. The resilient stationary terminal carriers 210, 200 have relatively strong resilience and can bend up and down.

On one end of each of the moveable connector arms 34, 35 (the end located away from where it pass through the differential transformer 33), a pair of moveable terminals 26, 26A and 27, 27A are provided, respectively.

On the electrical component mounting member 4, a second hot output conductor 212 and a second neutral output conductor 211 are provided. One end of the second hot output conductor 212 is provided with a stationary terminal 24A and the other end of it is soldered onto the electrical component mounting member 4 to be electrically connected to a hot output metal plate 214 and a hot output connecting screw 22. Similarly, one end of the second neutral output conductor 211 is provided with a stationary terminal 25A and the other end of it is soldered onto the electrical component mounting member 4 to be electrically connected to a neutral output metal plate 213 and a neutral output connecting screw 23.

One end of each of the hot and neutral output metal plates 214, 213 is machined into a U shape to receive the hot and neutral output connecting screws 22, 23 (the load end of the receptacle), respectively. The other end of each of the hot and neutral output metal plates 214, 213 is formed into connecting pins 215, 216, respectively, which are inserted in and soldered onto the electrical component mounting member 4 so that they are electrically connected to the second hot and neutral output conductors 212 and 211, respectively.

Figure 4:
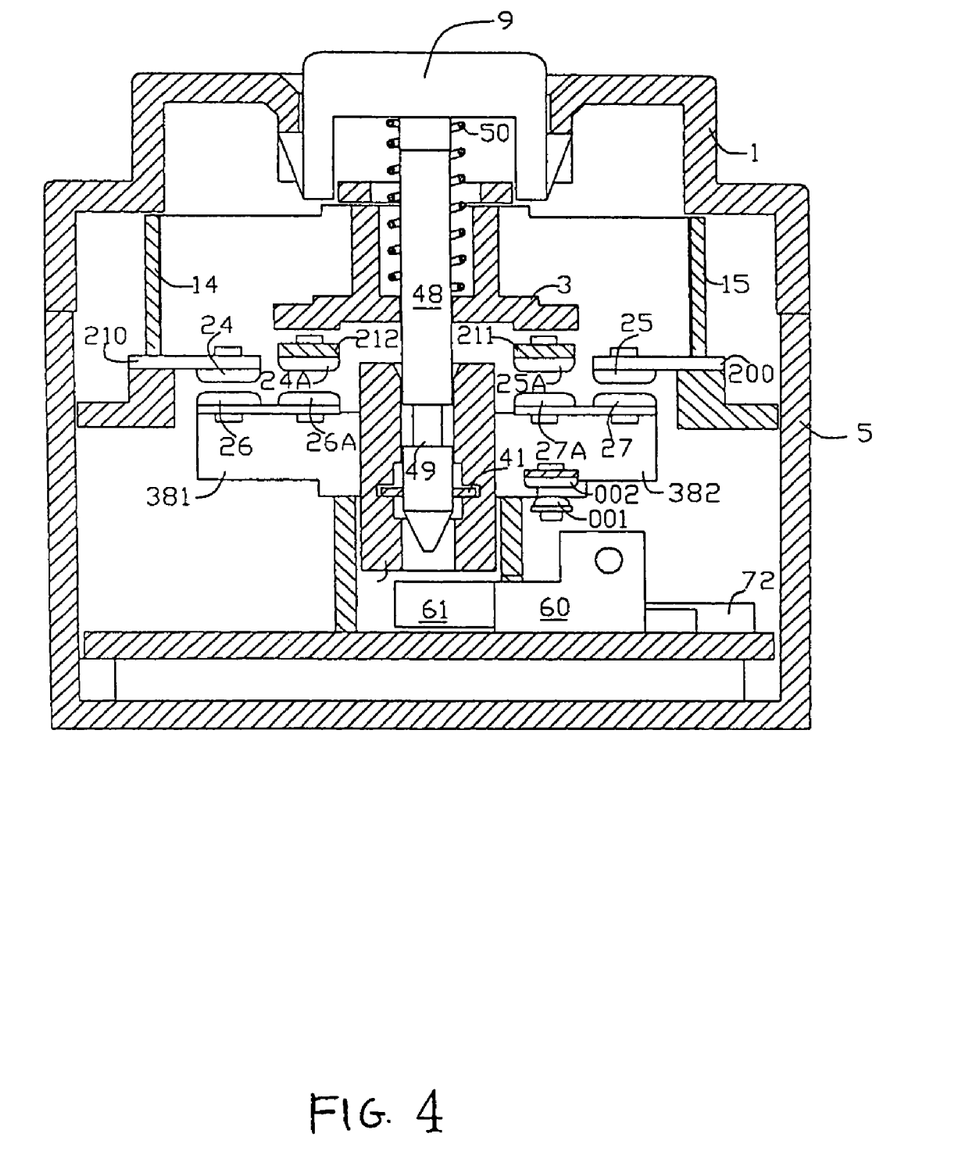
FIG. 4 is a cross-sectional view of the GFCI receptacle along A-A of FIG. 2 illustrating a condition when no power is output.
Figure 5:
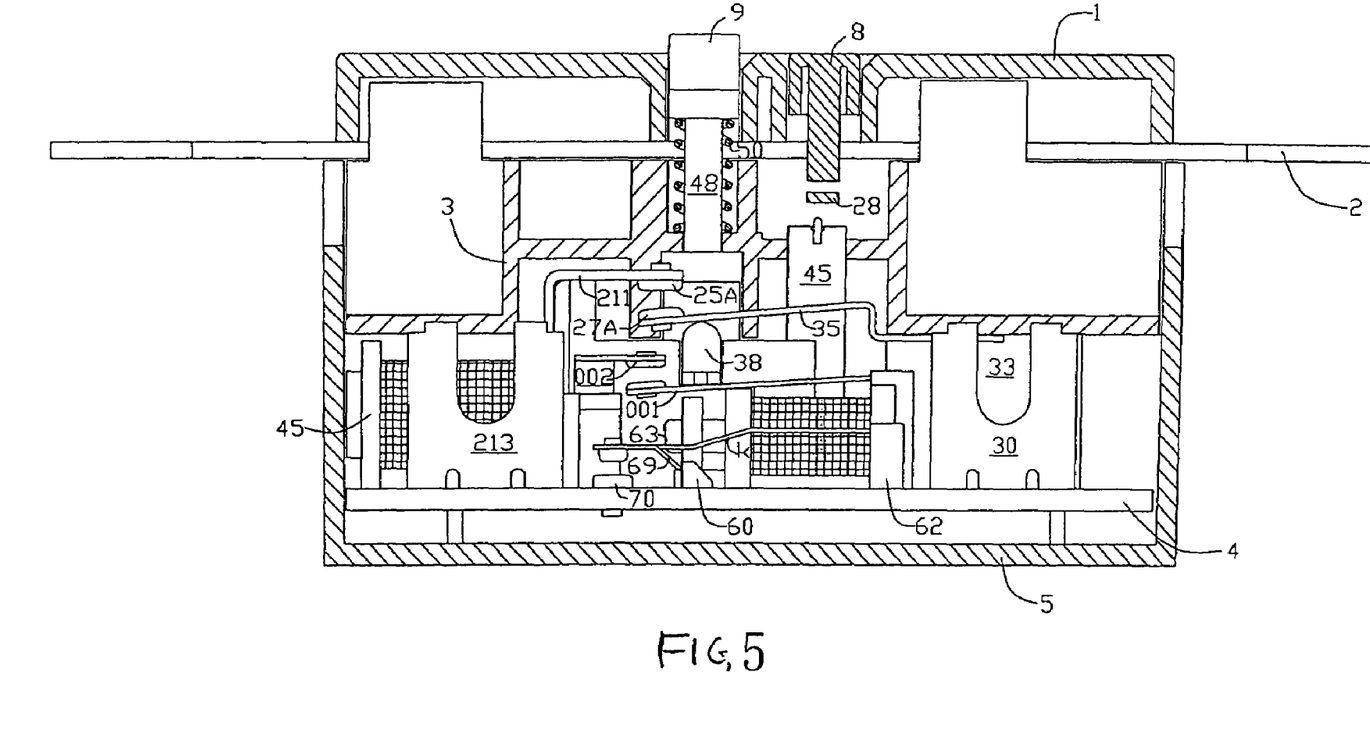
FIG. 5 is a cross-sectional view of the GFCI receptacle along B-B of FIG. 2 illustrating a condition when no power is output.
Figure 6:
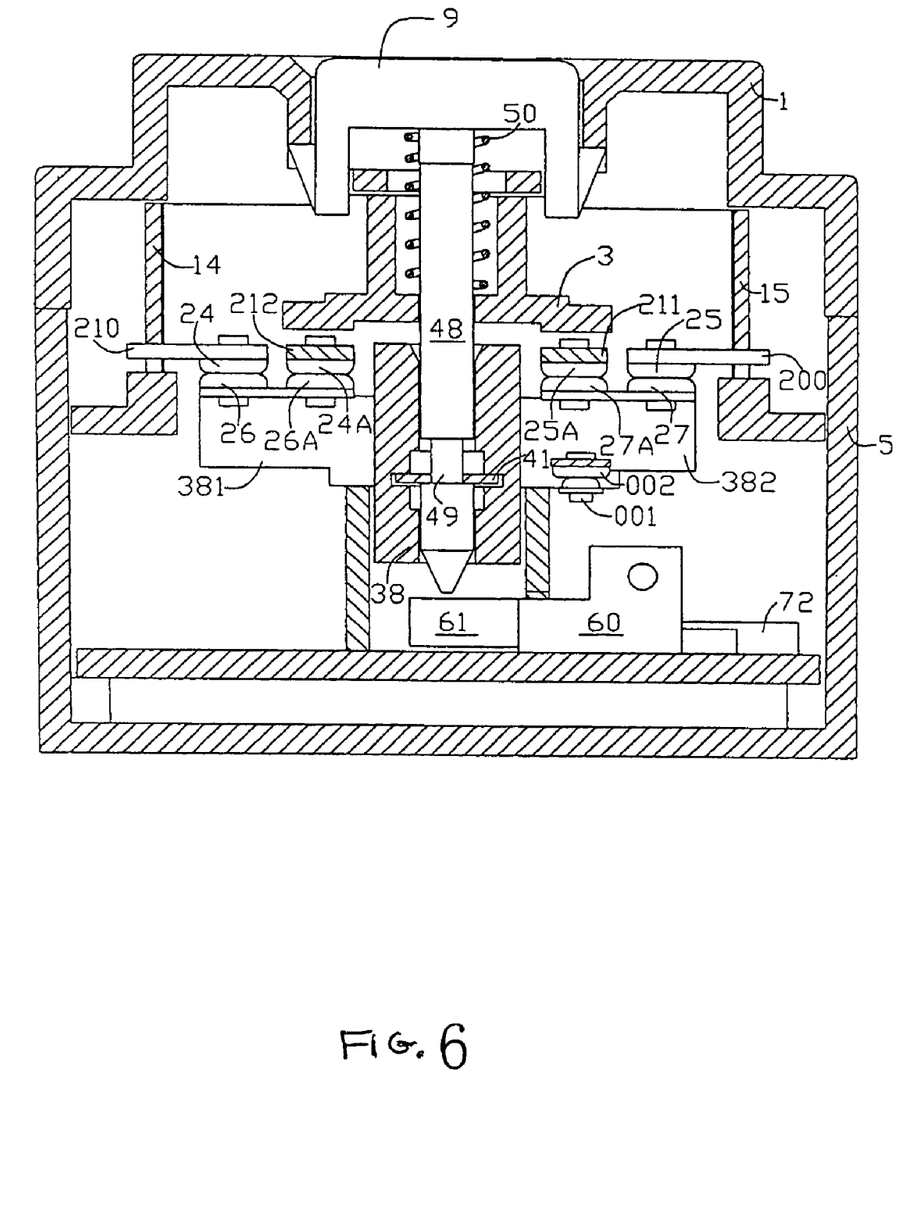
FIG. 6 is a cross-sectional view of the GFCI receptacle along A-A of FIG. 2 illustrating a condition when power is output.
Figure 7:
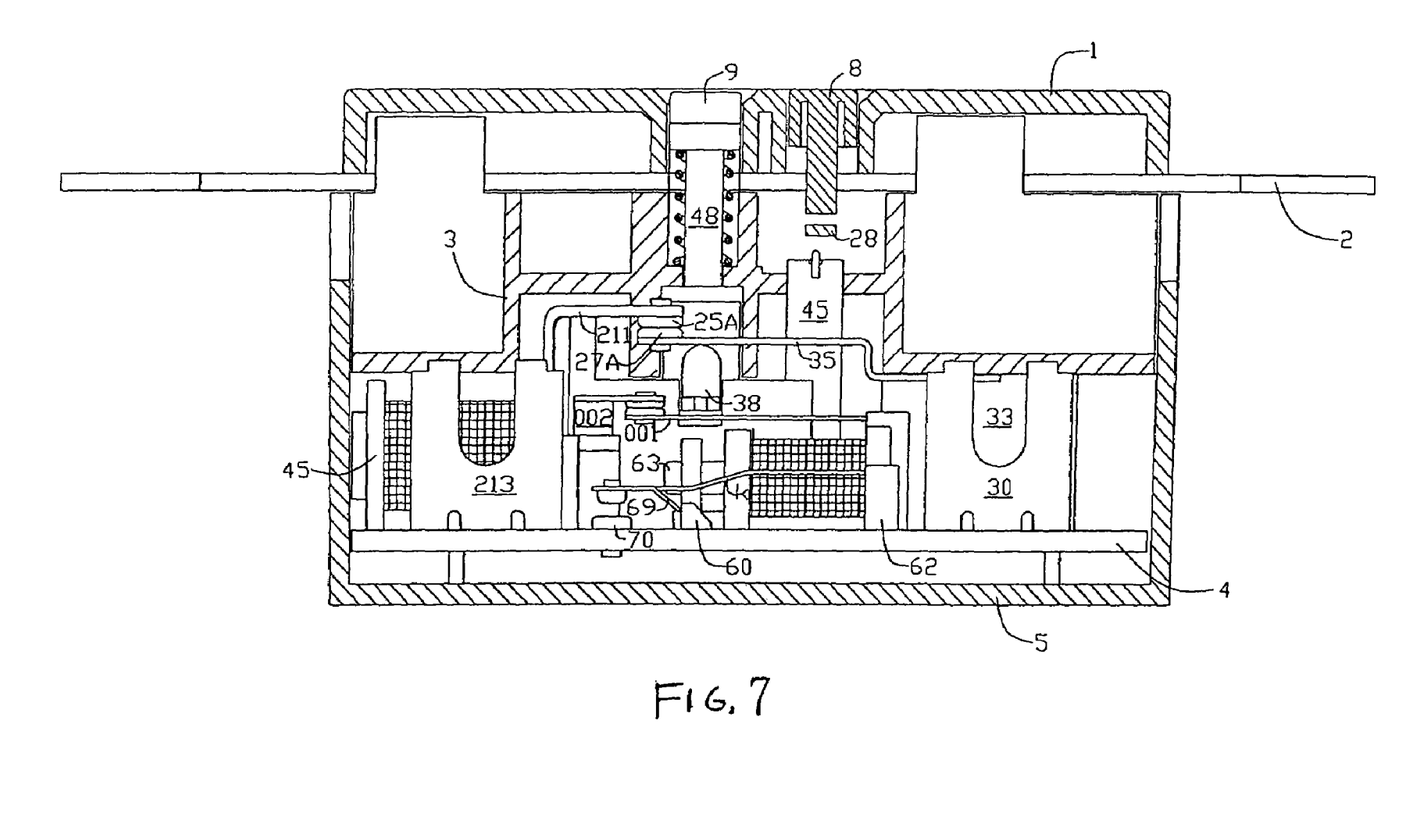
FIG. 7 is a cross-sectional view of the GFCI receptacle along B-B of FIG. 2 illustrating a condition when power is output.

As shown in FIGS. 1, 3 and 4, the moveable terminal 26 on the moveable connector arm 34 corresponds in position to the stationary terminal 24 on the first hot output conductor 14, and the moveable terminal 26A on the moveable connector arm 34 corresponds in position to the stationary terminal 24A on the second hot output conductor 212. Similarly, the moveable terminal 27 on the moveable connector arm 35 corresponds in position to the stationary terminal 25 on the first neutral output conductor 15, and the moveable terminal 27A on the moveable connector arm 35 corresponds in position to the stationary terminal 25A on the second neutral output conductor 211.

To ensure that the moveable terminals 26, 26A, 27, 27A on the moveable connector arms 34, 35 reliably come into contact with the stationary terminals 24, 24A, 25, 25A on the output conductors 14, 15, 212, 211, as shown in FIG. 4, the resilient stationary terminal carriers 210, 200 are provide on the first hot and neutral output conductors 14, 15, and the stationary terminals 24, 25 are disposed lower than the stationary terminals 24A, 25A. As shown in FIGS. 4-7, when a reset button 9 of the GFCI device is pressed down, a guiding member 48 passes through an opening 41 on the L-shaped lock member 40. When the reset button 9 is then released, the disconnecting mechanism 38 and its two side arms 381, 382 move upward, causing the moveable connector arms 34, 35 placed on the side arms 381, 382 to move upward. As a result, the moveable terminals 26, 27 on the moveable connector arms 34, 35 first contact the stationary terminals 24, 25 on the first hot and neutral output conductors 14, 15. Because the resilient stationary terminal carriers 210, 200 carrying the stationary terminals 24, 25 are resilient, the stationary terminals 24, 25 carried thereon are pushed upwards by the moveable connector arms 34, 35. The moveable terminals 26A, 27A on the moveable connector arms 34, 35 then come into contact with the stationary terminals 24A, 25A on the second hot and neutral output conductors 212, 211. In this way, the four moveable terminals on the moveable connector arms 34, 35 reliably contact the stationary terminals 24, 25, 24A, 25A on the output conductors 14, 15, 212, 211, and sufficient pressure is applied to the stationary terminals 24, 25 and the moveable terminals 26, 27 as they contact each other.

Figure 8:
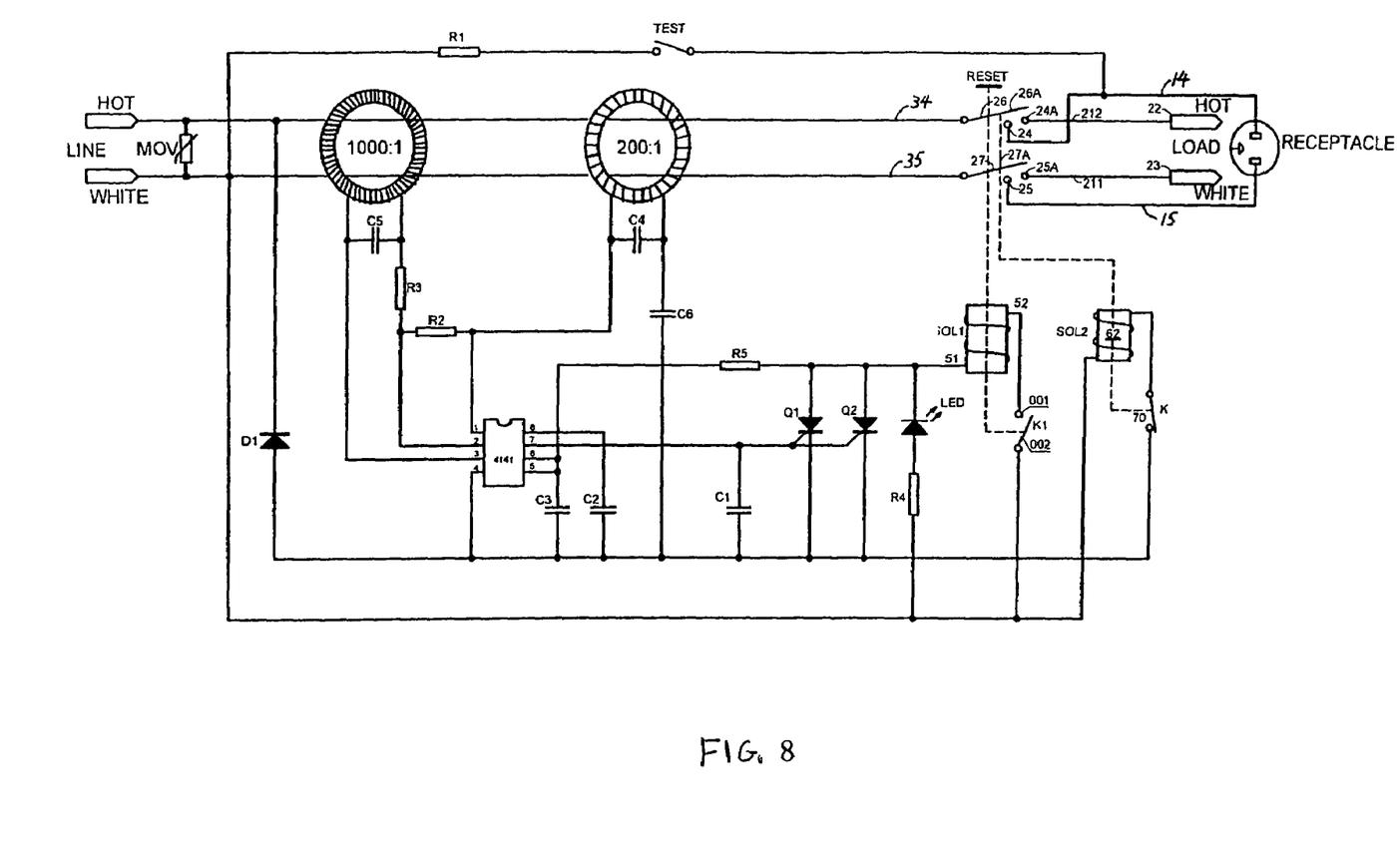
FIG. 8 is a circuit diagram of a GFCI receptacle according to an embodiment of the present invention.
Figure 9:
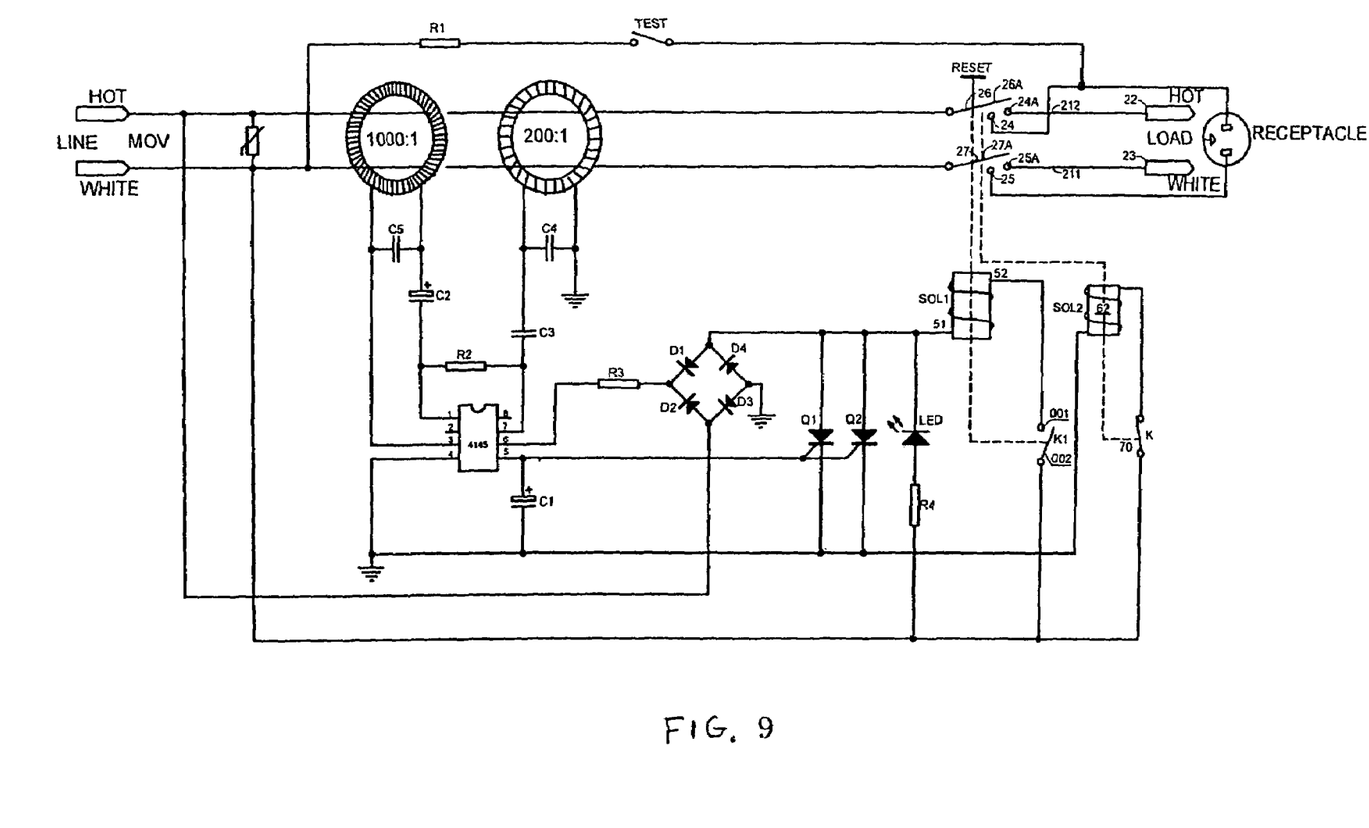
FIG. 9 is a circuit diagram of a GFCI receptacle according to another embodiment of the present invention.

As shown in FIG. 1, by providing the second hot and neutral output conductors 212, 211, the first hot and neutral output conductors 14 and 15 are electrically connected to the insertion outlets 6, 7 on the faceplate of the receptacle, and the second hot and neutral output conductors 212, 211 are electrically connected to the hot and neutral output connecting screws (terminals) 22, 23 on the two sides of the base 5 of the GFCI device. The first hot and neutral output conductors 14, 15 are not directly electrically connected to the second hot and neutral output conductors 212, 211; their electrical connection is achieved via the action of the moveable connector arms 34, 35, which are controlled by a control circuit of the GFCI device which has leakage current protection and reverse wiring protection functions (see FIGS. 8 and 9). Thus, as shown in FIGS. 8 and 9, during installation of the GFCI receptacle into the wall, if the power lines from the wall are incorrectly connected to the output connecting screws 22, 23 on the output (load) side of the GFCI receptacle, because the first hot and neutral output conductors 14, 15 are not directly electrically connected to the second hot and neutral output conductors 212, 211, and because the control circuit having a reverse wiring protection function will not cause the moveable connector arms 34, 35 to move, there will be no electrical connection between the first hot and neutral output conductors 14, 15 and the second hot and neutral output conductors 212, 211. As a result, in this reverse wiring condition, no power will be output at the insertion outlets 6, 7 on the face of the receptacle. Therefore, when reverse wiring error occurs during installation, not only the input end of the GFCI device lacks power output, the power outlets 6, 7 on the face of the receptacle also lack power output, thereby enhancing the safety of the GFCI device.

FIGS. 8 and 9 are circuit diagrams showing the connections of the electrical components on the circuit board of the GFCI device according to embodiments of the present invention. As shown in FIGS. 8 and 9, if the silicon-controlled rectifiers Q1 or Q2 are shorted, an electrical current will pass through the solenoid SOL1 for an extended period of time, which may cause the solenoid SOL1 to be burned out. To prevent the solenoid SOL1 from being burned out, as shown in FIGS. 1, 4, 5, 8 and 9, a switch K1 is provided below the side arm 382 of the disconnecting mechanism 38 and coupled to the reset button RESET. When the reset button RESET is pressed down, the two contact terminals 001 and 002 of the switch K1 are closed. When the reset button RESET returns to its un-pressed condition, the two contact terminals 001 and 002 of the switch K1 are open. The switch K1 is connected in series with the current path of the solenoid SOL1. When the GFCI device is not functioning normally, such as when the silicon-controlled rectifiers Q1 or Q2 are shorted, the reset button will not be reset normally, and as a result, the switch K1 will remain open. Therefore, before the abnormal condition in the GFCI device is eliminated, no current will pass through the solenoid SOL1, so that the solenoid SOL1 will not be burned out due to a short condition in the silicon-controlled rectifiers Q1 or Q2.

The GFCI device according to embodiments of the present invention has the following advantages. It effectively prevents power output at the insertion outlet on the faceplate of the receptacle when the power lines are incorrectly connected to the output end of the receptacle during installation. The contact between the moveable terminals and the stationary terminals is more reliable. Due to these improvements, the GFCI receptacle device according to embodiments of the present invention is safer and more reliable than the GFCI device described in commonly owned U.S. Pat. No. 7,009, 473.

It will be apparent to those skilled in the art that various modification and variations can be made in the GFCI device of the present invention without departing from the spirit or scope of the invention. Thus, it is intended that the present invention cover modifications and variations that come within the scope of the appended claims and their equivalents.

What is claimed is:

1. An improved ground-fault circuit interrupter device having a reverse wiring protection function and being adapted for connecting to hot and neutral power lines and hot and neutral load lines, comprising:

a cover;

an insulating member;

a base;

a mounting and insulating plate disposed between the cover and the insulating member;

an electrical component mounting member disposed within the base and located between the insulating member and the base;

first hot and neutral output conductors disposed on two sides of the insulating member, the first hot output conductor having a first insertion plate and a first resilient stationary terminal carrier carrying a first stationary terminal, the first neutral output conductor having a second insertion plate and a second resilient stationary terminal carrier carrying a second stationary terminal;

wherein the electrical component mounting member includes a differential transformer for detecting a leakage current, first and second moveable connector arms passing through the differential transformer and being adapted to be connected to the hot and neutral power lines, respectively, second hot and neutral output conductors, a disconnecting mechanism assembly for electrically connecting and disconnecting the first hot and neutral output conductors to and from the first and second moveable connector arms, and a reverse wiring protection mechanism, wherein the disconnecting mechanism assembly includes a solenoid, wherein the first moveable connector arm carries a first and a second moveable terminal and the second moveable connector arm carries a third and a fourth moveable terminal, wherein the second hot and neutral output conductors carry a third and a fourth stationary terminal, respectively, and are adapted to be electrically connected to the hot and neutral load lines, respectively, and wherein the first and third moveable terminals corresponds in position to the first and second stationary terminals, respectively, and the second and fourth moveable terminals corresponds in position to the third and fourth stationary terminals, respectively;

a reset button; and a switch coupled to the reset button, wherein the switch includes two contact terminals which are closed when the reset button is pressed down and open when the reset button returns to its un-pressed condition, and wherein when the two contact terminals of the switch are closed, the switch forms a current path in series with a current path of the solenoid.

2. The improved ground-fault circuit interrupter device of claim 1, wherein the first resilient stationary terminal carrier, the first hot output conductor and the first stationary terminal are formed as one piece by pressing, and wherein the second resilient stationary terminal carrier, the first neutral output conductor and the second stationary terminal are formed as one piece by pressing.

3. The improved ground-fault circuit interrupter device of claim 1, wherein the first and second stationary terminals on the first hot and neutral output conductors are disposed lower than the third and fourth stationary terminals on the second hot and neutral output conductors.

4. The improved ground-fault circuit interrupter device of claim 1, further comprising:
   a hot input conductor adapted for connecting to the hot power line; and
   a neutral input conductor adapted for connecting to a neutral power line,
   wherein the first and second moveable connector arms are electrically connected to the hot and neutral input conductors.

5. An improved ground-fault circuit interrupter device with a reverse wiring protection function, the device being adapted for connecting to hot and neutral power lines and hot and neutral load lines and having an insertion outlet adapted for receiving prongs of a plug, comprising:
   first hot and neutral output conductors electrically connected to the insertion outlet, the first hot output conductor having a first resilient stationary terminal carrier carrying a first stationary terminal, the first neutral output conductor having a second resilient stationary terminal carrier carrying a second stationary terminal;
   a first and a second moveable connector arm adapted to be connected to the hot and neutral power lines, respectively;
   a first and a second moveable terminal carried on the first moveable connector arm;
   a third and a fourth moveable terminal carried on the second moveable connector arm;
   second hot and neutral output conductors adapted to be electrically connected to the hot and neutral load lines, respectively;
   a third and a fourth stationary terminal carried on the second hot and neutral output conductors, respectively;
   wherein the first and third moveable terminals corresponds in position to the first and second stationary terminals, respectively, and the second and fourth moveable terminals corresponds in position to the third and fourth stationary terminals, respectively,
   a disconnecting mechanism assembly for electrically connecting and disconnecting the first hot and neutral output conductors to and from the first and second moveable connector arms, wherein the disconnecting mechanism assembly includes a solenoid;
   a reverse wiring protection mechanism;
   a reset button; and
   a switch coupled to the reset button, wherein the switch includes two contact terminals which are closed when the reset button is pressed down and open when the reset button returns to its un-pressed condition, and wherein when the two contact terminals of the switch are closed, the switch forms a current path in series with a current path of the solenoid.

6. The improved ground-fault circuit interrupter device of claim 5, further comprising:
   a cover;
   an insulating member;
   a base;
   a mounting and insulating plate disposed between the cover and the insulating member; and
   an electrical component mounting member disposed within the base and located between the insulating member and the base,
   wherein the first hot and neutral output conductors are disposed on two sides of the insulating member, and
   wherein the first and second moveable connector arms, the second hot and neutral output conductors, the disconnecting mechanism assembly and the reverse wiring protection mechanism are mounted on the electrical component mounting member.

7. The improved ground-fault circuit interrupter device of claim 5, further comprising:
   a differential transformer mounted on the electrical component mounting member for detecting a leakage current, wherein the first and second moveable connector arms pass through the differential transformer.

8. The improved ground-fault circuit interrupter device of claim 5, further comprising:
   a hot input conductor adapted for connecting to the hot power line;
   a neutral input conductor adapted for connecting to a neutral power line,
   wherein the first and second moveable connector arms are connected to the hot and neutral input conductors.

9. A ground-fault circuit interrupter device, comprising:
   hot and neutral input conductors;
   hot and neutral output conductors;
   a disconnecting mechanism assembly, which includes a solenoid for electrically connecting and disconnecting the hot and neutral input conductors to and from the hot and neutral output conductors, respectively, a semiconductor switching element connected in a current path of the solenoid, and a detection circuit for detecting a leakage current and controlling a conducting state of the semiconductor switching element;
   a reset button; and
   a switch coupled to the reset button, wherein the switch includes two contact terminals which are closed when the reset button is pressed down and open when the reset button returns to its un-pressed condition, and wherein when the two contact terminals of the switch are closed, the switch forms a current path in series with the current path of the solenoid.

* * * * *